United States Patent
Zhu et al.

(10) Patent No.: US 8,977,681 B2
(45) Date of Patent: Mar. 10, 2015

(54) PRE-FETCHING DATA

(75) Inventors: Yi Sheng Zhu, Shanghai (CN); Xiao Fu, Shanghai (CN); Wen Gang Luo, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/536,302

(22) Filed: Jun. 28, 2012

(65) Prior Publication Data

US 2013/0041937 A1 Feb. 14, 2013

(30) Foreign Application Priority Data

Jun. 30, 2011 (CN) .............................. 2011 0 183536

(51) Int. Cl.
*G06F 15/16* (2006.01)
*H04L 29/08* (2006.01)

(52) U.S. Cl.
CPC ................................. *H04L 67/2847* (2013.01)
USPC ........................................ 709/203; 709/200

(58) Field of Classification Search
CPC ........................ G06F 12/0862; H04L 67/2847
USPC .................................................. 709/200, 203
See application file for complete search history.

(56) References Cited

U.S. PATENT DOCUMENTS

| | | | | |
|---|---|---|---|---|
| 5,892,935 A * | 4/1999 | Adams | ........................... | 712/207 |
| 5,983,324 A * | 11/1999 | Ukai et al. | ..................... | 711/137 |
| 6,012,052 A * | 1/2000 | Altschuler et al. | .................... | 1/1 |
| 6,484,239 B1 * | 11/2002 | Hill et al. | ....................... | 711/137 |
| 6,629,138 B1 * | 9/2003 | Lambert et al. | ............... | 709/224 |
| 6,701,316 B1 * | 3/2004 | Li et al. | ..................... | 370/395.41 |
| 6,917,960 B1 * | 7/2005 | Decasper et al. | ............. | 709/203 |
| 6,959,318 B1 * | 10/2005 | Tso | ................. | 709/203 |
| 6,993,630 B1 * | 1/2006 | Williams et al. | .............. | 711/137 |
| 7,243,136 B2 * | 7/2007 | Huston et al. | .................. | 709/217 |
| 7,302,425 B1 * | 11/2007 | Bernstein et al. | ...................... | 1/1 |
| 7,389,330 B2 * | 6/2008 | Dillon et al. | .................. | 709/219 |
| 7,490,110 B2 | 2/2009 | Ewen et al. | | |
| 7,523,193 B2 | 4/2009 | Jennings et al. | | |
| 7,836,073 B2 | 11/2010 | Ahn | | |
| 7,941,609 B2 * | 5/2011 | Almog | ........................... | 711/137 |
| 8,312,181 B1 * | 11/2012 | Faith et al. | ...................... | 710/22 |
| 8,326,923 B1 * | 12/2012 | Szabo et al. | .................. | 709/203 |
| 2002/0062384 A1 * | 5/2002 | Tso | ............................... | 709/229 |
| 2005/0055426 A1 * | 3/2005 | Smith et al. | .................... | 709/219 |

(Continued)

FOREIGN PATENT DOCUMENTS

KR 1020090016361 A 2/2009

OTHER PUBLICATIONS

V. Rajamani et al., "Automated assessment of aggregate query imprecision for pervasive computing," Proceeding DAIS '09 Proceedings of the 9th IFIP WG 6.1 International Conference on Distributed Applications and Interoperable Systems, year 2009.

*Primary Examiner* — Anthony Mejia
(74) *Attorney, Agent, or Firm* — Bryan Butler (57) ABSTRACT

A pre-fetching request is received by a server from a client. The pre-fetching request is performed to pre-fetch data from a data source connected to the server according to an indication of the pre-fetching request. The pre-fetched data is sent from the server to the client upon receiving an actual request for the pre-fetched data. As such, an integrated capability of a server and a client can be employed to perform data pre-fetch, to improve overall performance of the server and the client.

11 Claims, 4 Drawing Sheets

(56) References Cited

U.S. PATENT DOCUMENTS

| | | |
|---|---|---|
| 2005/0262248 A1 | 11/2005 | Jennings et al. |
| 2007/0038601 A1 | 2/2007 | Guha |
| 2007/0067698 A1* | 3/2007 | King et al. .................... 714/763 |
| 2007/0192474 A1* | 8/2007 | Decasper et al. ............. 709/223 |
| 2007/0244849 A1 | 10/2007 | Predovic |
| 2008/0163380 A1* | 7/2008 | Liu ................................ 726/28 |
| 2008/0235190 A1 | 9/2008 | Zhao |
| 2008/0244232 A1* | 10/2008 | Sherman et al. .............. 712/207 |
| 2008/0301151 A1* | 12/2008 | Idei et al. ........................ 707/10 |
| 2008/0301300 A1* | 12/2008 | Toub .............................. 709/227 |
| 2009/0182941 A1* | 7/2009 | Turk .............................. 711/118 |
| 2009/0313374 A1* | 12/2009 | Murphy et al. ............... 709/226 |
| 2010/0050273 A1* | 2/2010 | Liu ................................. 726/28 |
| 2011/0087842 A1* | 4/2011 | Lu et al. ........................ 711/126 |
| 2011/0131341 A1* | 6/2011 | Yoo et al. ...................... 709/237 |
| 2012/0191862 A1* | 7/2012 | Kovvali et al. ................ 709/227 |
| 2012/0246257 A1* | 9/2012 | Brown .......................... 709/213 |
| 2013/0067170 A1* | 3/2013 | Lam .............................. 711/137 |
| 2013/0103785 A1* | 4/2013 | Lyon ............................. 709/217 |

* cited by examiner

PRE-FETCHING DATA

RELATED APPLICATIONS

The present patent application claims priority under 35 USC 119 to the previously filed Chinese patent application of the same titled, filed on Jun. 30, 2011, and assigned China patent application number 201110183536.8.

BACKGROUND

Obtaining data from a server is the basis for many network applications executed at a client. The terms "server" and "client" are construed in a broad sense. For instance, for two parties involved in network communication, the party that requests data is a client whereas the party that provides data is a server. With the rapid development of Internet and information technology (IT) infrastructure, a primary functionality of a server focuses on responding to and processing requests made by a client while the functionality of storing data is transferred to an external data source. In such a scenario, in response to a request for data made by the client, the server obtains the data from the external data source and then returns this data to the client.

SUMMARY

A method of an embodiment of the disclosure is for conducting data pre-fetch by a server. The method includes receiving a pre-fetching request from a client. The method includes executing the pre-fetching request to pre-fetch data from a data source connected to the server according to an indication of the pre-fetching request. The method includes sending pre-fetched data to the client upon receiving an actual request for the pre-fetched data.

A device of an embodiment of the disclosure is for pre-fetching data. The device includes hardware, which includes a processor. The device includes a server communication module implemented at least by the processor. The server communication module is to pre-fetch data from a data source connected to the device according to an indication of a pre-fetching request received from a client, so as to send the pre-fetched data upon receiving an actual request for the pre-fetched data. The device includes a server pre-fetched data storage module implemented at least by the processor, to store the pre-fetched data.

An apparatus of an embodiment of the disclosure is for conducting data pre-fetch by a server. The apparatus includes hardware, which includes a processor. The apparatus includes a receiving unit implemented at least by the hardware, to receive a pre-fetching request from a client. The apparatus includes an executing unit implemented at least by the hardware, to execute the pre-fetching request to pre-fetch data from a data source connected to the server according to an indication of the pre-fetching request. The apparatus includes a sending unit implemented at least by the hardware, to send the pre-fetched data to the client upon receiving an actual request for the pre-fetched data.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, in response to a request for data made by a client, a server may obtains the data from an external data source and then return this data to the client. In such a scenario, in response to a request for data made by the client, the server obtains the data from the external data source and then returns the same to the client. Many solutions have been developed for enhancing the speed in which the client obtains data, some of which involve data pre-fetch. A typical data pre-fetch technology generally includes one or more of two architectures.

Figure 2:
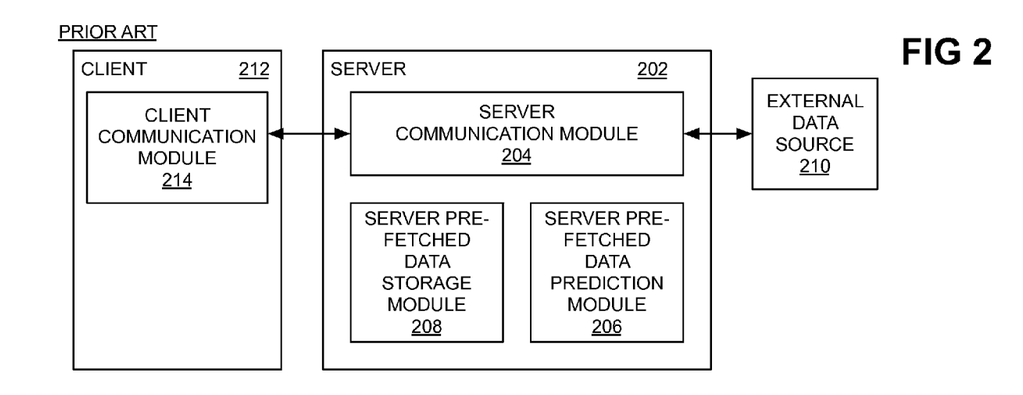
FIGS. 2 and 3 are diagrams of computer systems in which data pre-fetch is performed in conventional manners.

FIG. 2 shows a typical data pre-fetch technology. As shown in FIG. 2, the server 202 includes a server communication module 204 for communication interaction with the client 212 (which includes a client communication module 214) or the external data source 210. The server 202 further includes a server pre-fetched data prediction module 206 for recording a history of the client 212 requesting data or a history of the server 202 accessing the external data source 210, and for predicting data that subsequently may need to be extracted from the external data source 210 by analyzing this history. The server communication module 204 pre-fetches the data from the external data source 210 based on a result of the analyzing and stores the same into a server pre-fetched data storage module 208. As such, if the pre-fetched data is subsequently requested by the client 212, the server 202 can extract the data from the server pre-fetched data storage module 208 and send the same to the client 212. Since it is quicker to access the pre-fetched data storage module 208 than to access the external data source 210, the speed at which the client 212 obtains data is improved.

The solution illustrated in FIG. 2 requires recording the history of the client 212 requesting data or the history of the server 202 accessing the external data source. This generally requires a relatively large storage capability, which in turn demands further improvement on the existing server system in terms of data storage capability. Moreover, analyzing and predicting may utilize computing capability of the server 202. The solution illustrated in FIG. 2 further requires analyzing the communication history. However, generally speaking, the method of analyzing communication history and thereby obtaining a predicted result is model-based. The client 212 that requests data from the server 202 may correspond to different models, and thus it is difficult to obtain a predicted result applicable to all such clients 212 by analyzing the communication history of any given client 212.

Figure 3:
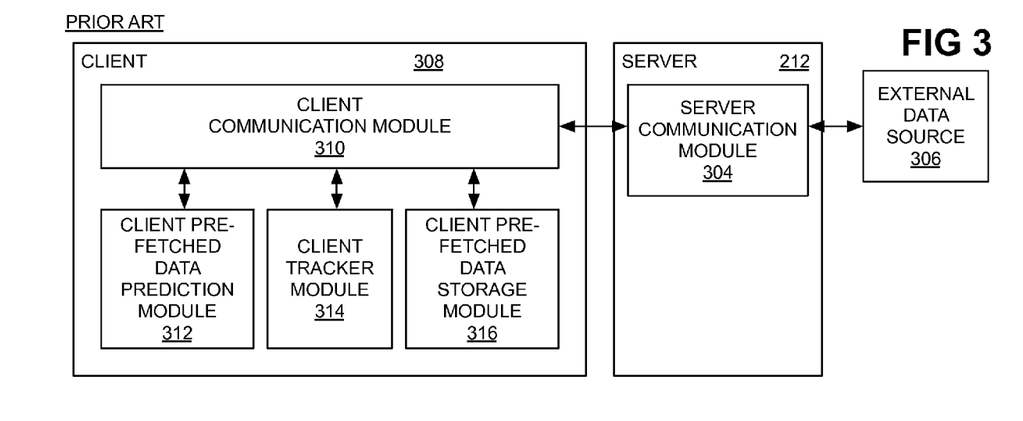

FIG. 3 shows another typical data pre-fetch technology. As shown in FIG. 3, the client 308 includes a client pre-fetched data prediction module 312 for recording a history of the client 308 requesting data, and for predicting data that may subsequently need to be requested from the server 302 by analyzing the history. A client communication module 310 sends pre-fetching requests to the server 302 (which includes a server communication module 304) based on a result of this analyzing so as to pre-fetch the data, and stores the pre-fetched data into the client pre-fetched data storage module 316.

Compared to the solution illustrated in FIG. 2, the solution illustrated in FIG. 3 stores the history of the client 308 requesting data at the client 308 and analyzes the history using computing capability of the client 308, and then makes a prediction, which thus reduces the burden imposed on the server 302. Since the client 308 and the prediction model usually have a relatively stable correspondence therebetween, the client 308 more easily makes an effective prediction than the server 302 does.

In the solution illustrated in FIG. 3, the pre-fetched data needs to be transmitted to the client 308 from the server 302 via a network. There is a time difference between the moment when the client 308 makes the prediction and the moment when the client 308 receives the pre-fetched data, during which the pre-fetched data may vary. However, this problem can be solved by adding a client tracker module 314 to the client 308. The tracker module 314 is a module for tracking data variation. The client tracker module 314 periodically sends a query request to the server 302. The client tracker module 314 can also send a variation query request to the server 302 in the case when the pre-fetched data actually needs to be used. In response to the variation query request, the server 302 checks whether the pre-fetched data on the external storage 306 has varied, and if so delivers the variation to the client 308. Then, the client 308 accordingly updates the client pre-fetched data storage module 316. Under poor network conditions, however, such a tracking mechanism may fail to indicate variations of the pre-fetched data in the client pre-fetched data storage module 316 in time. In addition, repeatedly submitting query requests to the server 302 increases the burden on the server 302.

The techniques disclosed herein overcome these and other shortcomings of existing pre-fetch technologies. Such techniques make use of an integrated capability of a server and a client to perform data pre-fetch. As such, overall performance of the server and the client is improved.

Figure 1:
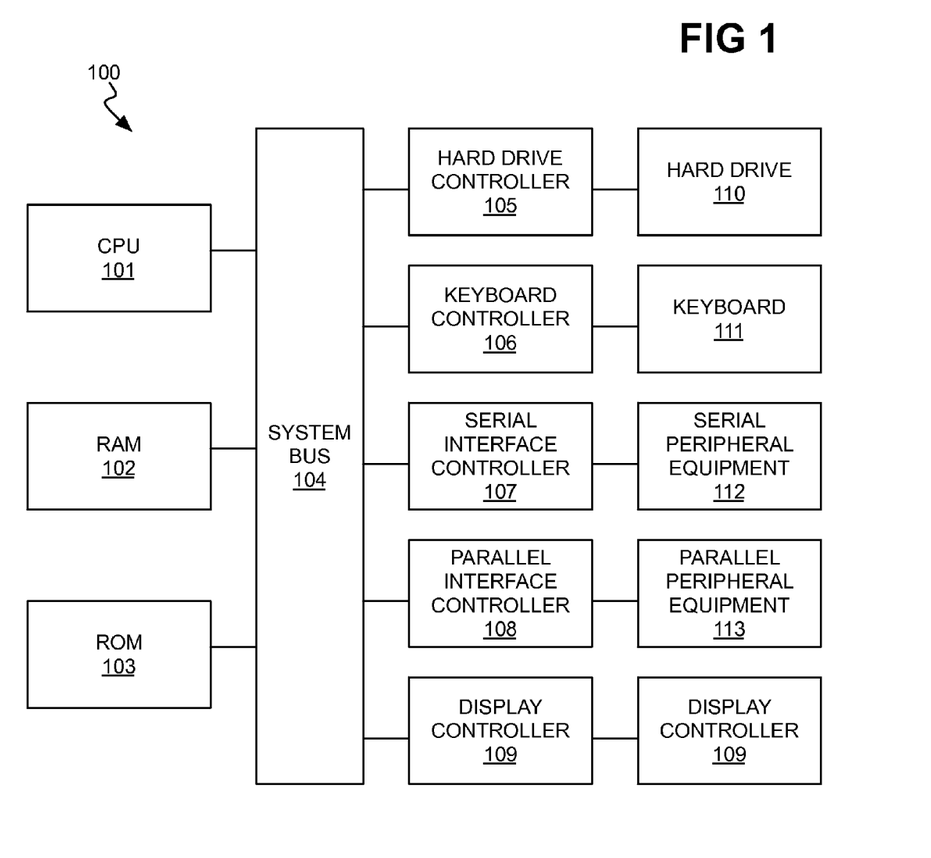
FIG. 1 is a diagram of an example computing in which data pre-fetch can be implemented.

FIG. 1 shows an example computer system 100. The computer system 100 can include CPU (central processing unit) 101, RAM (random access memory) 102, ROM (read only memory) 103. The system 100 can also include a system bus 104, a hard drive controller 105, a keyboard controller 106, a serial interface controller 107, a parallel interface controller 108, and a display controller 109. The system 100 can further include a hard drive 110, a keyboard 111, serial peripheral equipment 112, parallel peripheral equipment 113, and a display 114. The CPU 101, RAM 102, ROM 103, the hard drive controller 105, the keyboard controller 106, the serial interface controller 107, the parallel interface controller 108 and the display controller 109 are coupled to the system bus 104. The hard drive 110 is coupled to the hard drive controller 105, the keyboard 111 is coupled to the keyboard controller 106, the serial peripheral equipment 112 is coupled to the serial interface controller 107, the parallel peripheral equipment 113 is coupled to the parallel interface controller 108, and the display 114 is coupled to the display controller 109. It is to be understood that the structure as shown in FIG. 1 is only for the exemplary purpose rather than any limitation to the present invention. In some cases, some devices may be added to or removed from the computer system 100 based on specific situations and implementations.

Figure 4:
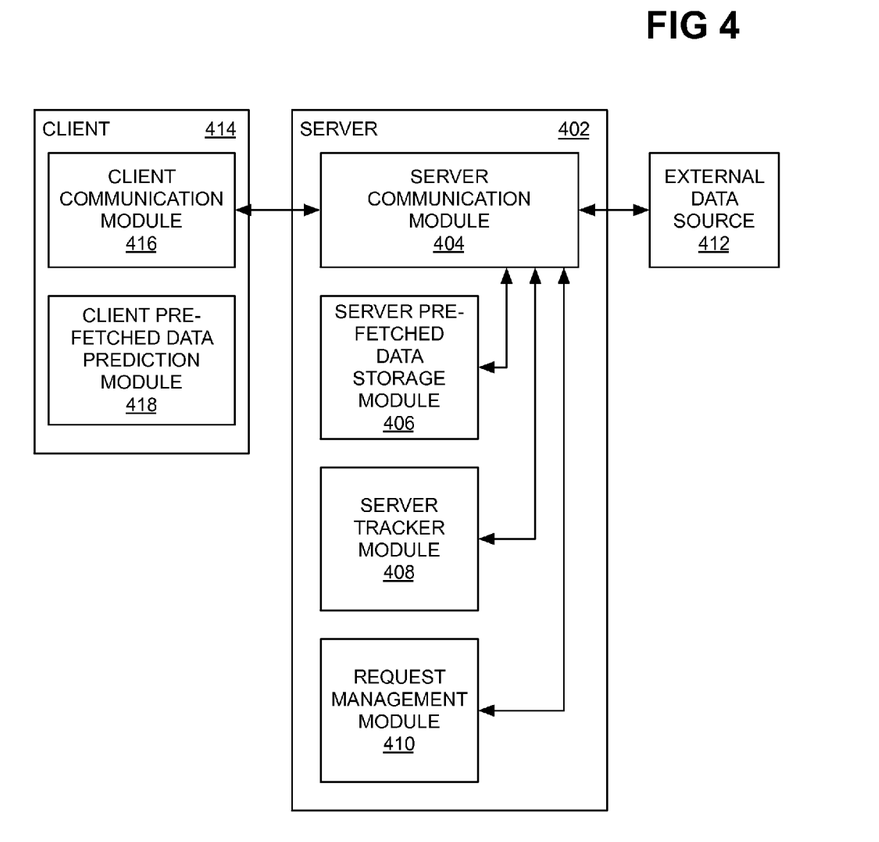
FIG. 4 is a diagram of an example computing system in which data pre-fetch occurs in accordance with innovative techniques disclosed herein.

FIG. 4 shows an example system implementing an innovative data pre-fetch technique. The client pre-fetched data prediction module 418 of the client 414 is used for predicting data that subsequently may need to be requested from the server 402 according to a history of the client 414 requesting data from the server 402. The client communication module 416 sends a pre-fetching request to the server 402 according to a result of this predicting, in which the pre-fetching request indicates data that needs to be pre-fetched from the data source 412.

Accordingly, the server communication module 404 of the server 402 is used for pre-fetching data from the data source 412 according to the pre-fetching request received from the client 414, so as to send the pre-fetched data to the client 414 upon receiving an actual request for this pre-fetched data. The server pre-fetched data storage module 406 is used for storing pre-fetched data.

As noted above, the client and the prediction model usually have a relatively stable correspondence therebetween, and thus the client 414 can more effectively predict data that subsequently may need to be requested than the server 402. As for the server 402, it is unnecessary to store a history of any client 414 requesting data or to record a history of the server 402 accessing the external data source 412, nor to make analysis and predictions according the history. This mitigates the requirements on storing capability and computing capability of the server 402.

In one implementation, the server 402 can include a server tracker module 408 for updating pre-fetched data in the server pre-fetched data storage module 406 according to the variations of the pre-fetched data in the data source 412. For example, triggered by some event or events, the server tracker module 408 can check if the pre-fetched data has varied (i.e., has changed) in the external data source 412. The events may include the event corresponding to the server 402 having received an actual request for the pre-fetched data or an event that a timing has reached a certain time length threshold indicating that the pre-fetched data previously retrieved may be stale. If the pre-fetched data has varied in the data source 412, the server tracker module 408 accordingly updates the pre-fetched data in the server pre-fetched data storage module 406.

Compared to using a client tracker module as is conventional, using a server tracker module 408 to track the variations of the pre-fetched data in the data source can more effectively update the varied pre-fetched data in the data source 412. First, the server tracker module 408 can query the data source 412 without requiring the server 402 handling the pre-fetching request or the query request sent from the client 414, which thus reduces the load on the server 402. Second, the server tracker module 408 does not need to transmit the variations of the pre-fetched data to the client 414 over a network connecting the server 402 and the client 414, but just updates the local server pre-fetched data storage module 406. Only when the pre-fetched data is actually requested is it necessary to use the network. As such, network bandwidth is saved.

As noted above, the pre-fetched data is determined according to a prediction that is made based on a history of accessing data on the data source 412. The prediction may have errors and thus the client 414 may not actually request the pre-fetched data stored at the server 402. Therefore, the server 402 should process pre-fetching requests under the condition or constraint that the processing of actual requests will not be adversely affected. With regard to this feature, the server 402 can further include a request management module 410. The request management module 410 schedules processing of pre-fetching requests and processing of actual requests, and preferentially processes the actual requests. For example, pre-fetching requests and actual requests may be stored in a pre-fetching request storage area and an actual request storage area, respectively, of the module 410, and pre-fetching requests in the pre-fetching request storage area processed only when the actual request storage area is empty (i.e., there are no outstanding actual requests).

In some cases, the priority of the pre-fetching request can be enhanced. The operation of the request management module 410 is thus described in more detail below. The server 402 may further process other types of requests. However, for sake of simplicity, just two kinds of requests (i.e., pre-fetching requests and actual requests) are described below as examples. The management of pre-fetching requests and actual requests can, though, be expanded to situations where other types of requests are also processed by the server 402.

The pre-fetching request includes at least an indication of data to be pre-fetched. The indication may expressly designate a position of the data to be pre-fetched in the data source 412, may designate the conditions that the data to be pre-fetched should satisfy, and/or may be one or more pieces of query sentences. The pre-fetching request can further include a pre-fetching request expiration time. For example, the pre-fetching request may designate a point in time in the future as an expiration moment or point in time; the pre-fetching request may also include a timestamp as well as a period of validity from this timestamp. The pre-fetching request can include an identifier that identifies the particular client 414 which has initiated the pre-fetching request and also can identify the client application that may need the pre-fetched data.

Figure 5:
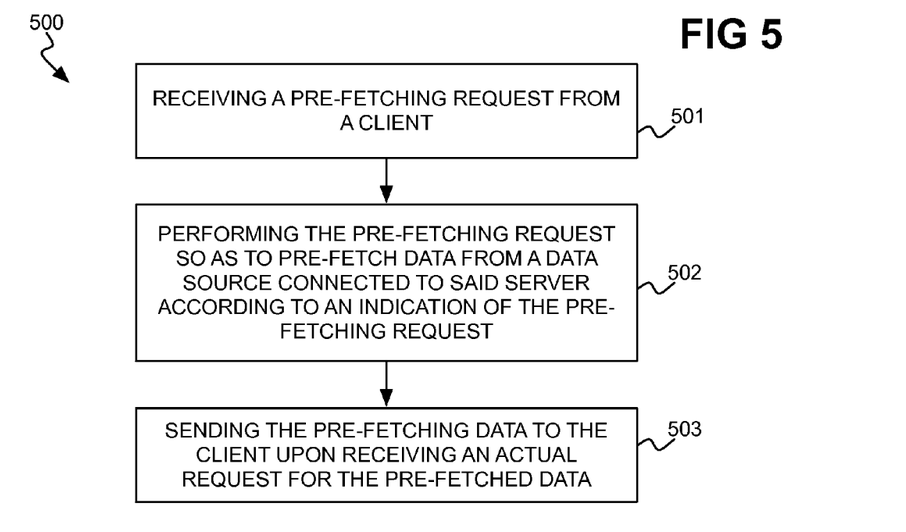
FIG. 5 is a flowchart of an example method for data pre-fetch in accordance with innovative techniques disclosed herein.

FIG. 5 shows an example method for pre-fetching data by a server in accordance with an innovative technique. A pre-fetching request from a client is received (501). Upon receiving the pre-fetching request from the client, the server can immediately process the pre-fetching request in one implementation. In another implementation, a pre-fetching request storage area is set so that the pre-fetching request is temporarily stored in the pre-fetching request storage area when or if the server cannot immediately process the pre-fetching request. It can further be determined whether the pre-fetching request storage area is full before storing the pre-fetching request in the pre-fetching request storage area. If the pre-fetching request storage area is not full, the pre-fetching request is thus stored therein.

As noted above, the pre-fetching request can include an expiration time. In such cases, whether the pre-fetching request is still valid can be first determined. As such, only if the pre-fetching request is still valid is the pre-fetching request stored in the pre-fetching request storage area. The server can set the expiration time for the pre-fetching request before storing the pre-fetching request in the pre-fetching request storage area. If the pre-fetching request does not include an expiration time, a predetermined expiration time may be designated for the pre-fetching request. By comparison, if the pre-fetching request itself includes an expiration time, then the specified expiration time is stored. Further, an expiration time can be set for the pre-fetching request by default, and/or the expiration time for the pre-fetching request can be set or corrected according to the credit (i.e., validity) status of the client that initiated the pre-fetching request.

For example, if a client has been found to often initiate expired pre-fetching requests, the credit or validity status of this client is bad or invalid. Accordingly, a relatively shorter period of validity can be set or corrected for this client in general or for the particular pre-fetching request sent from this client. That a pre-fetching request is expired means that the server does not receive the actual request for the pre-fetched data until at or after the expiration time for this pre-fetching request occurs. The server can determine whether the pre-fetching request is expired based on the expiration time that has been set. As for a pre-fetching request that includes an expiration time, keeping its expiration time unchanged is also within the meaning of the term "setting" in this respect; that is, setting the expiration time of a pre-fetching request includes the scenario in which the request itself already includes an expiration time.

It is noted that, before storing the pre-fetching request in the pre-fetching request storage area, the server can check and set the expiration time in a manner as described above. In another implementation, the server may just immediately set the expiration time and later check the corresponding expiration time when subsequently reading the pre-fetching request from the pre-fetching request storage area. Compared to checking the expiration time at the time of reading the pre-fetching request, checking the expiration time before storing the pre-fetching request in the pre-fetching request storage area can prevent expired pre-fetching request from entering the pre-fetching request storage area, which saves the storage resources of the server from having to store such expired requests.

After being stored in the pre-fetching request storage area, the pre-fetching request waits for subsequent processing. The pre-fetching request may be performed when it is read out from the pre-fetching request storage area the first time. In another implementation, the pre-fetching request may be performed at the time of storing the pre-fetching request in the pre-fetching request storage area.

Performing the pre-fetching request includes at least pre-fetching data designated by the pre-fetching request from a data source and storing the pre-fetched data in a server pre-fetched data storage module. In one implementation, after performing the pre-fetching request, a tracker trigger can be designated, specified, or configured for this request can track variations of the pre-fetched data in the data source. For example, the tracker trigger may trigger a server tracker module when the pre-fetching request is subsequently read out from the pre-fetching request storage area. As such, the probability that the pre-fetching request is performed is increased. If the server has received an actual request, then this actual request may be similarly stored in the actual request storage area.

Data is pre-fetched from the data source according to an indication of the pre-fetching request (502). As noted above, pre-fetching requests that cannot be processed immediately can be stored in the pre-fetching request storage area. A request management module polls the pre-fetching request storage area according to a certain strategy and reads a pre-fetching request that has not been read during this polling. For example, polling may be initiated in accordance with a predetermined periodic cycle (i.e., the polling may be cyclically performed). Description is made below as to one manner by which such polling can be achieved. Furthermore, it is assumed herein that a pre-fetching request has not been performed when storing the pre-fetching request in the pre-fetching request storage area.

As described above, the request management module maintains two request storage areas that are used for storing pre-fetching requests and actual requests respectively, and preferentially processes the actual requests. In one implementation, only when the actual request storage area is empty is a pre-fetching request read from the pre-fetching request storage area. As such, processing of actual requests by the server can be ensured, but this may result in pre-fetching requests never being performed. Therefore, priority can be set for pre-fetching requests, and when the priority for a pre-fetching request is higher than a priority threshold, the pre-fetching request is read even when the actual request storage area is not empty.

The priority can be set according to the length of the time that has elapsed from the point in time at which the pre-fetching request is received. That is, a function can be employed that provides the priority of a pre-fetching request based on the time that the pre-fetching request thus has far waited to be performed. This function can be an increasing function. That is, the longer the time a pre-fetching request waits to be performed, the higher the priority of the pre-fetching request. However, this function can instead be a decreasing function. That is, the longer the time a pre-fetching request waits to be performed, the lower the priority of the pre-fetching request. The function can in another implementation be a first-increasing then-decreasing function or a first-decreasing then-increasing function. As such, when the time a pre-fetching request waits to be performed falls within a certain range, the priority of the pre-fetching request may be highest or lowest. Other functions may also be employed to define the relationship between the waiting time for a pre-fetching request to be performed and its priority.

In one implementation, only when a read pre-fetching request has not expired is the pre-fetching request performed. In another implementation, only when a read pre-fetching request has not been performed and is still valid is it performed. Although it has been assumed that the pre-fetching request is not performed when storing the pre-fetching request in the pre-fetching request storage area, the pre-fetching request may have been performed during the previous variation-detection polling. In one implementation, an identifier may thus be set for a pre-fetching request to indicate whether the request has been performed. In another implementation, if a tracker trigger is specified, designated, or configured for a pre-fetching request when performing the pre-fetching request, then determining whether the request has been performed can thus be achieved by checking whether the request has a corresponding tracker trigger.

As for an expired pre-fetching request, the request management module performs a cleaning operation in relation thereto. If such a pre-fetching request has not been performed, it is deleted from the pre-fetching request storage area. If the pre-fetching request has been performed, for example, during the previous polling or at the time it was stored in the pre-fetching request storage area, the pre-fetched data is deleted from the server pre-fetched data storage module in addition to the pre-fetching request being deleted from the pre-fetching request storage area. Any corresponding trigger is deleted as well. Checking the expiration time can prevent the data indicated by the pre-fetching request from residing in the server pre-fetched data storage module for too long a time. Since it has been assumed that the pre-fetching request is not performed when storing the pre-fetching request in the pre-fetching request storage area, the determination regarding the expiration time can also prevent the processing load that would otherwise result from performing expired pre-fetching requests.

In one implementation, an expiration trigger can be set for a pre-fetching request when it is stored in the pre-fetching request storage area. The expiration trigger can automatically determine or dictate determination as to whether its corresponding pre-fetching request is or has expired. Correspondingly, the request management module can then perform a request operation when it has been determined that the pre-fetching request is or has expired. Ultimately, the example method of FIG. 5 can conclude by the server, upon receiving an actual request for pre-fetched data, sending the pre-fetched data to the client (503).

Figure 6:
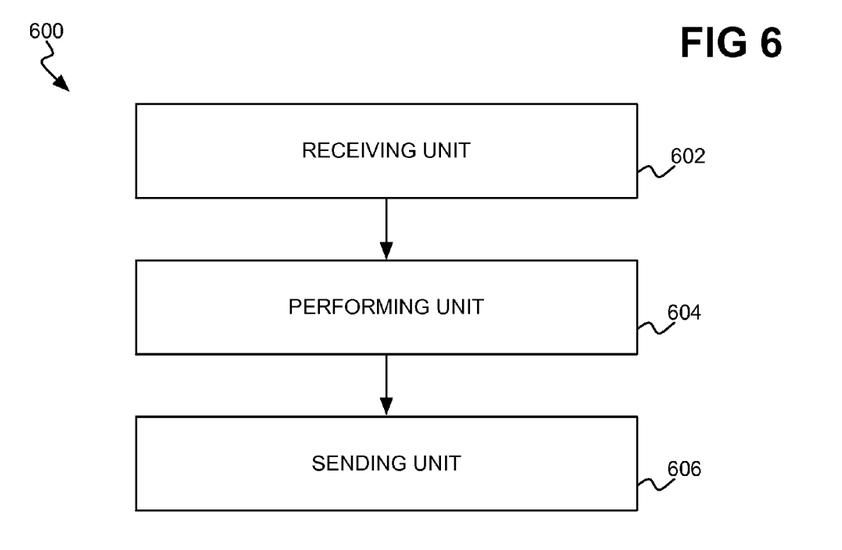
FIG. 6 is a diagram of an example apparatus for performing data pre-fetch in accordance with innovative techniques disclosed herein.

FIG. 6 shows an example apparatus 600 for performing data pre-fetch in accordance with an innovative technique. This apparatus 600 is thus for conducting data pre-fetch by a server. The apparatus 600 includes a receiving unit 602 configured to receive a pre-fetching request from a client, and a performing unit 604 configured to perform the pre-fetching request so as to pre-fetch data from a data source connected to the server according to an indication of the pre-fetching request. The apparatus 600 also includes a sending unit 606 configured to send the pre-fetched data to the client upon receiving an actual request for the pre-fetched data.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:

receiving, by a server, a pre-fetching request from a client;

after receiving the pre-fetching request, determining, by the server, whether the client provided the expiration time of the pre-fetching request;

in response to determining that the client did not provide the expiration time, setting, by the server, the expiration time of the pre-fetching request, such that the server specifies the expiration time;

in response to determining that the client did provide the expiration time, setting, by the server, the expiration time of the pre-fetching request as provided by the client, such that the client specifies the expiration time;

after setting the expiration time of the pre-fetching request, storing, by the server, the pre-fetching request within a pre-fetching request storage area of the server different from an actual request storage area of the server in which non-prefetching requests are stored;

after storing the pre-fetching request within the pre-fetching request storage area, assigning, by the server, the pre-fetching request a dynamic priority that changes over time based on a length of time that the pre-fetching request remains in the pre-fetching request storage area;

regardless of whether any non-prefetching requests are stored in the actual request storage area, at a point in time at which the dynamic priority of the prefetching request exceeds a priority threshold, removing, by the server, the pre-fetching request from the pre-fetching request storage area;

after removing the pre-fetching request from the pre-fetching request storage area, determining, by the server, whether the pre-fetching request has expired based on an expiration time thereof;

in response to determining that the pre-fetching request has expired, discarding, by the server, the pre-fetching request, such that the pre-fetching request is not executed; and in response to determining that the pre-fetching request has not expired, executing, by the server, the pre-fetching request, and storing, by the server, the data that has been received for subsequent fulfillment of an actual request for the data.

2. The method of claim 1, further comprising:

receiving, by the server, the actual request for the data from the client; and in response to receiving the actual request for the data, sending, by the server, the data as has been pre-fetched and stored, to the client.

3. The method of claim 1, wherein receiving, by the server, the pre-fetching request from the client comprises receiving, by the server, the pre-fetching request and the expiration time of the pre-fetching request from the client, such that the client specifies the expiration time.

4. The method of claim 1, wherein at the point in time at which the pre-fetching request is removed from the pre-fetching request storage area, at least one non-prefetching request is stored in the actual request storage area.

5. The method of claim 1, wherein the dynamic priority of the pre-fetching request increases with the length of time that the pre-fetching request remains in the pre-fetching request storage area.

6. The method of claim 1, wherein the dynamic priority of the pre-fetching request decreases with the length of time that the pre-fetching request remains in the pre-fetching request storage area.

7. A server device comprising:

a processor; and a computer-readable storage device storing computer-executable instructions, the computer-readable storage device including a pre-fetch request storage area and an actual request storage area, non-prefetching requests stored in the actual request storage area, wherein execution of the computer-executable instructions by the processor cause the server device to:

receive a pre-fetching request from a client;

after receiving the pre-fetching request, determine whether the client provided the expiration time of the pre-fetching request;

in response to determining that the client did not provide the expiration time, set the expiration time of the pre-fetching request, such that the server specifies the expiration time;

in response to determining that the client did provide the expiration time, set the expiration time of the pre-fetching request as provided by the client, such that the client specifies the expiration time;

after setting the expiration time of the pre-fetching request, store the pre-fetching request within the pre-fetching request storage area of the server;

after storing the pre-fetching request within the pre-fetching request storage area, assign the pre-fetching request a dynamic priority that changes over time based on a length of time that the pre-fetching request remains in the pre-fetching request storage area;

regardless of whether any non-prefetching requests are stored in the actual request storage area, at a point in time at which the dynamic priority of the prefetching request exceeds a priority threshold, remove the pre-fetching request from the pre-fetching request storage area;

after removing the pre-fetching request from the pre-fetching request storage area, determine whether the pre-fetching request has expired based on an expiration time thereof;

in response to determining that the pre-fetching request has expired, discard the pre-fetching request, such that the pre-fetching request is not executed; and in response to determining that the pre-fetching request has not expired, execute the pre-fetching request and store the data that has been received for subsequent fulfillment of an actual request for the data.

8. The server device of claim 7, wherein execution of the computer-executable instructions by the processor further cause the server device to:

receive the actual request for the data from the client; and in response to receiving the actual request for the data, send the data as has been pre-fetched and stored, to the client.

9. The server device of claim 7, wherein at the point in time at which the pre-fetching request is removed from the pre-fetching request storage area, at least one non-prefetching request is stored in the actual request storage area.

10. A storage device storing computer-readable code that when executed by a processor of a server causes the processor to perform processing that comprises:

receiving a pre-fetching request from a client;

after receiving the pre-fetching request, determining whether the client provided the expiration time of the pre-fetching request;

in response to determining that the client did not provide the expiration time, setting the expiration time of the pre-fetching request, such that the server specifies the expiration time;

in response to determining that the client did provide the expiration time, setting the expiration time of the pre-fetching request as provided by the client, such that the client specifies the expiration time;

after setting the expiration time of the pre-fetching request, storing the pre-fetching request within a pre-fetching request storage area of the server different from an actual request storage area of the server in which non-prefetching requests are stored;

after storing the pre-fetching request within the pre-fetching request storage area, assigning the pre-fetching request a dynamic priority that changes over time based on a length of time that the pre-fetching request remains in the pre-fetching request storage area;

regardless of whether any non-prefetching requests are stored in the actual request storage area, at a point in time at which the dynamic priority of the prefetching request exceeds a priority threshold, removing the pre-fetching request from the pre-fetching request storage area;

after removing the pre-fetching request from the pre-fetching request storage area, determining whether the pre-fetching request has expired based on an expiration time thereof;

in response to determining that the pre-fetching request has expired, discarding the pre-fetching request, such that the pre-fetching request is not executed; and in response to determining that the pre-fetching request has not expired, executing the pre-fetching request, and storing the data that has been received for subsequent fulfillment of an actual request for the data.

11. The storage device of claim 10, wherein the processing further comprises:

receiving the actual request for the data from the client; and in response to receiving the actual request for the data, sending the data as has been pre-fetched and stored, to the client.

* * * * *